(12) United States Patent
Dossi et al.

(10) Patent No.: US 11,623,626 B2
(45) Date of Patent: Apr. 11, 2023

(54) METHOD FOR ESTIMATING A BRAKING FORCE APPLICABLE BETWEEN PAD AND BRAKE DISC BY AN ELECTRIC PARKING-BRAKING SYSTEM OF A VEHICLE AND ELECTRIC PARKING-BRAKING SYSTEM OF A VEHICLE IMPLEMENTING SUCH METHOD

(71) Applicants: FRENI BREMBO S.P.A., Curno (IT); POLITECNICO DI MILANO, Milan (IT)

(72) Inventors: Stefano Dossi, Curno (IT); Alfonso Tarantini, Curno (IT); Giulio Calamai, Curno (IT); Gianmarco Rallo, Milan (IT); Simone Formentin, Milan (IT); Sergio Matteo Savaresi, Milan (IT)

( * ) Notice: Subject to any disclaimer, the term of this patent is extended or adjusted under 35 U.S.C. 154(b) by 595 days.

(21) Appl. No.: 16/634,351

(22) PCT Filed: Jul. 27, 2018

(86) PCT No.: PCT/IB2018/055618
§ 371 (c)(1),
(2) Date: Jan. 27, 2020

(87) PCT Pub. No.: WO2019/021246
PCT Pub. Date: Jan. 31, 2019

(65) Prior Publication Data
US 2021/0380089 A1 Dec. 9, 2021

(30) Foreign Application Priority Data
Jul. 27, 2017 (IT) .................. 102017000086468

(51) Int. Cl.
*B60T 13/74* (2006.01)
*B60T 7/10* (2006.01)
(Continued)

(52) U.S. Cl.
CPC ............ *B60T 13/741* (2013.01); *B60T 7/107* (2013.01); *B60T 8/171* (2013.01); *B60T 8/172* (2013.01);
(Continued)

(58) Field of Classification Search
CPC ............... F16D 66/00; F16D 2066/005; F16D 2066/006; B60T 13/741; B60T 8/171; B60T 8/172
See application file for complete search history.

(56) References Cited

U.S. PATENT DOCUMENTS

| 7,992,691 B2 | 8/2011 | Maron et al. |
| 8,397,879 B2 | 3/2013 | Maron et al. |

(Continued)

FOREIGN PATENT DOCUMENTS

| DE | 102009047127 A1 | 5/2011 |
| DE | 102012205030 A1 | 10/2013 |

(Continued)

OTHER PUBLICATIONS

Abstract for EP 1236632 (no date).*
(Continued)

*Primary Examiner* — Nicholas J Lane
(74) *Attorney, Agent, or Firm* — Marshall & Melhorn, LLC (57) ABSTRACT

A method for estimating a braking force applicable between pad and brake disc by an electric parking-braking system of a vehicle is described. The method may include detecting, by one or more sensors of electric quantities of an electric motor, an electric current delivered to the electric motor and an instantaneous value of an electric voltage for electrically supplying the electric motor, during a parking-braking operation. The parking-braking operation may have a first non-contact stage between a first pair of pads of a first brake (Continued)

caliper and a first brake disc. The parking-braking operation may also have a second contact stage between the first pair of pads of the first brake caliper and the first brake disc.

8 Claims, 8 Drawing Sheets

(51) Int. Cl.
*B60T 8/171* (2006.01)
*B60T 8/172* (2006.01)
*F16D 66/00* (2006.01)

(52) U.S. Cl.
CPC ........ *F16D 66/00* (2013.01); *B60Y 2400/308* (2013.01); *B60Y 2400/81* (2013.01); *F16D 2066/005* (2013.01); *F16D 2066/006* (2013.01)

(56) References Cited

U.S. PATENT DOCUMENTS

| | | |
|---|---|---|
| 8,521,388 B2 | 8/2013 | Baehrle-Miller et al. |
| 9,068,613 B2 | 6/2015 | Baehrle-Miller et al. |
| 2010/0308645 A1* | 12/2010 | Maron .................. B60T 17/221 701/70 |
| 2011/0224880 A1 | 9/2011 | Baehrle-Miller et al. |
| 2012/0193177 A1* | 8/2012 | Goto ....................... F16D 65/18 188/161 |
| 2013/0338895 A1* | 12/2013 | Bieltz ..................... B60T 7/042 701/70 |
| 2014/0172259 A1* | 6/2014 | Blattert ................... B60T 7/122 701/70 |
| 2015/0019099 A1* | 1/2015 | Imai ......................... B60T 7/02 701/70 |
| 2016/0341270 A1* | 11/2016 | Baehrle-Miller ..... B60T 13/741 |

FOREIGN PATENT DOCUMENTS

| | | | |
|---|---|---|---|
| EP | 1236632 A1 * | 9/2002 | ............ B60T 13/741 |
| WO | WO/2009053429 A1 | 4/2009 | |
| WO | WO/2009053430 A1 | 4/2009 | |
| WO | WO/2010100276 A1 | 9/2010 | |

OTHER PUBLICATIONS

European Patent Office, International Search Report with Written Opinon, issued in PCT/IB2018/055618, dated Oct. 4, 2018, 12 pages, European Patent Office, Rijswijk, Netherlands.

* cited by examiner

METHOD FOR ESTIMATING A BRAKING FORCE APPLICABLE BETWEEN PAD AND BRAKE DISC BY AN ELECTRIC PARKING-BRAKING SYSTEM OF A VEHICLE AND ELECTRIC PARKING-BRAKING SYSTEM OF A VEHICLE IMPLEMENTING SUCH METHOD

FIELD OF THE INVENTION

The present invention relates to electric parking-braking systems, in particular, to a method for estimating a braking force applicable between pad and brake disc by an electric parking-braking system of a vehicle and an electric parking-braking system of a vehicle implementing such method.

PRIOR ART

Typically, an electric parking-braking system of a vehicle consists of an electronic control unit which, in response to a received parking-braking request command (either manual or automatic) is adapted to control an actuator inside which an electric motor is present.

The rotary motion of the electric motor is then converted by an electromechanical motion conversion gear mechanism into a linear motion of a piston adapted to thrust a pad against a brake disc operatively connected to a wheel of the vehicle.

The thrust of the pad on the disc brake is applied until a minimum applicable braking force value is reached adapted to ensure a safe parking-braking action.

The minimum braking force value applicable between pad and brake disc is determined during the step of programming of the electronic control unit according to the characteristics of the vehicle and its conditions of use, such as maximum vehicle load, road gradient, physical shape of the brake disc and other considerations of kinematic type.

When such minimum braking force value applicable between pad and brake disc is reached, the electric motor is switched off and the electric parking-braking system, irreversible by design, hold the parking of the vehicle.

It is fundamental to determine the value of the braking force applicable between pad and brake disc each time from when the electric motor is started in order to verify when the braking force applicable between pad and brake disc reaches the minimum applicable braking force value as effectively as possible and rapidly stop the electric motor, whereby preventing the braking force from continuing to be applied unnecessarily and to harmfully increase.

However, in order to meet this need, for reasons of economy, it is not possible to equip an electric parking-braking system, such as the one described above, with one or more force sensors adapted to detect the braking force applicable between pad and brake disc directly.

Therefore, the trend of recent years has been to define methods for indirectly determining the braking force applicable between pad and brake disc.

A first method belonging to the prior art envisages measuring, by the electronic control unit, the electric current generated by the electric motor from when it is switched on and comparing this electric current value with a reference electric current value, previously stored in a memory unit of the electronic control unit, corresponding to a minimum value of braking force applicable between pad and brake disc from experience acquired on test bench.

When such reference electric current value is reached, the electronic control unit stops the electric motor and the parking-braking of the vehicle is maintained by virtue of the irreversibility of electromechanical parking-braking system.

Instead, a second method belonging to the prior art envisages comparing, by the electronic control unit, the measured value of the electric current generated by the electric motor from when it is switched on with a reference electric current value contained in a table, previously stored in a memory unit of the electronic control unit, in which contains a reference electric current value corresponding to a minimum value of braking force applicable between pad and brake disc for each possible initial power supply voltage (working condition) of an electric parking-braking system (9V, 12, 16V and so on).

Also in this case, when this reference electric current value is reached, the electronic control unit stops the electric motor and the parking-braking of the vehicle is maintained by virtue of the irreversibility of the electromechanical parking-braking system.

Both of the aforesaid methodologies, being not very accurate, also display the disadvantage of having a high dispersion of the minimum values of braking force applied between pad and brake disc of the electric parking-braking system of the vehicle.

Therefore, since a minimum value of braking force applicable between pad and brake disc must always be guaranteed for vehicle safety reasons, the high dispersion of the minimum values of braking force applicable and supplied by the electric parking-braking system obliges to set reference current electric values high enough to apply an excessive stress on the electric parking-braking system as a whole which can be contained and supported only by oversizing the system, whereby increasing dimensions of some of its components and the overall production costs.

SOLUTION

It is the object of the present invention to devise and make available a method for estimating a braking force applicable between pad and brake disc by an electric parking-braking system of a vehicle which makes it possible to at least partially solve the aforesaid drawbacks with reference to the prior art and in particular which guarantees high accuracy and reliability in small dimensions and at low cost to allow the electric parking-braking system of the vehicle to intervene as timely and safely as possible.

Such object is achieved by a method according to claim 1.

It is a further object of the present invention an electric parking-braking system of a vehicle, implementing such method.

FIGURES

Further features and advantages of the method and system according to the invention will be apparent from the following description of preferred embodiments, given by way of indicative, non-limiting examples, with reference to the accompanying figures, in which.

DESCRIPTION OF PREFERRED EMBODIMENTS

Figure 1:
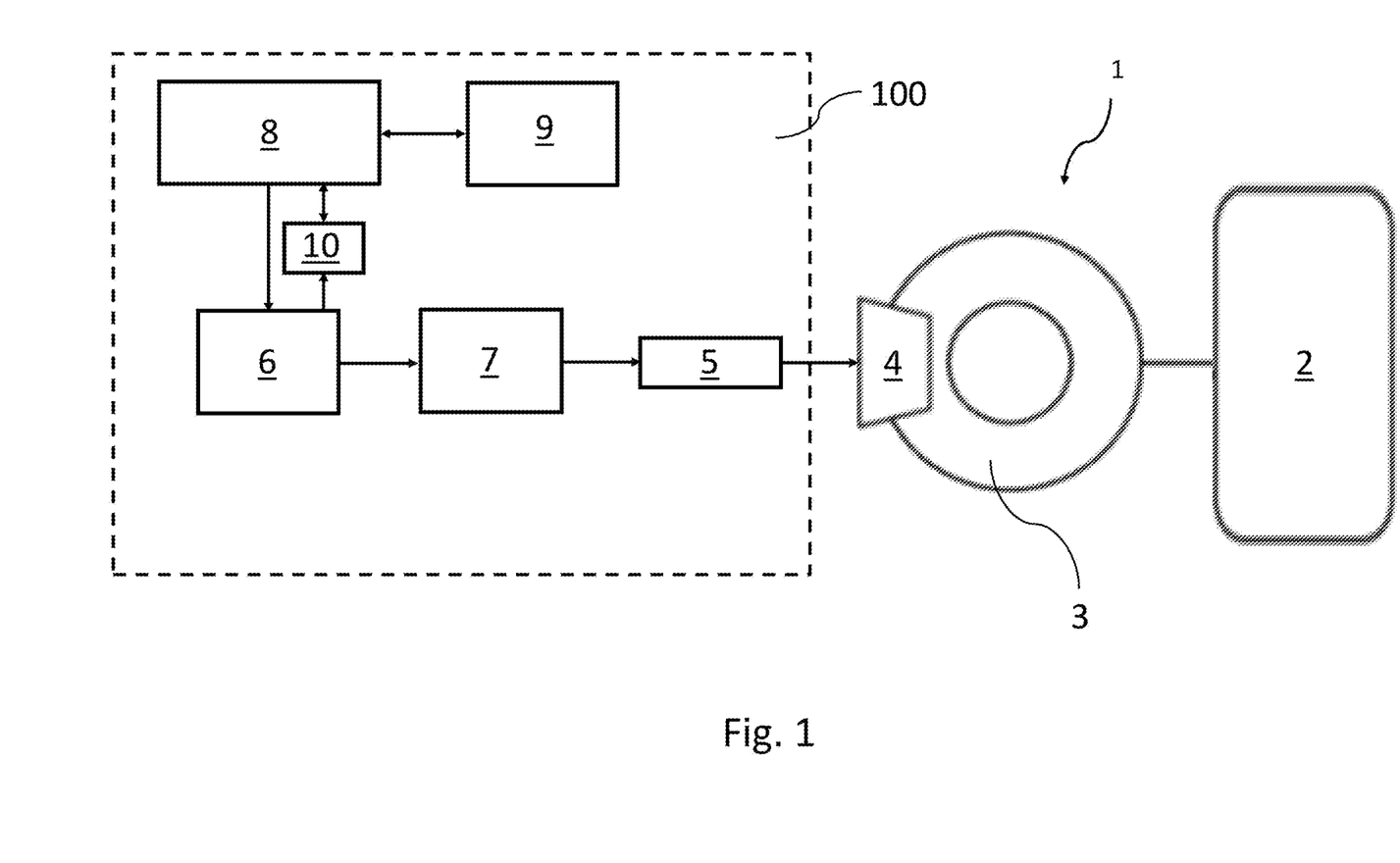
FIG. 1 shows, by means of a block scheme, an electric parking-braking system of a vehicle, implementing the method of the invention, according to an embodiment.

With reference now to FIG. 1, reference numeral 100 indicates an electric parking-braking system of a vehicle, hereinafter also electric system or simply system, according to an embodiment of the present invention.

It is worth noting that equal or similar elements in the figures will be indicated by the same numeric or alphanumeric references.

For the purposes of the present description, the term vehicle means any vehicle or motorcycle, also of commercial type, having two, three, four or more wheels, and it is only partially shown in FIG. 1 and indicated as a whole by reference numeral 1.

Again with reference to the embodiment in FIG. 1, the vehicle 1 comprises at least a first moving member 2 (e.g. a wheel) of the vehicle 1.

The vehicle 1 further comprises a first brake disc 3 mounted on said at least one first moving member 2.

The vehicle 1 further comprises a first brake caliper 4 operatively associated with the first brake disc 3.

The first brake caliper 4 comprises a first pair of pads adapted to be actuated to apply a braking force on the first brake disc 3.

Turning back to the system 100, it further comprises a first piston 5, operatively connected to a first pad of the first pair of pads of the first brake caliper 4, which can be actuated to thrust the first pair of pads of the first brake caliper 4 so as to apply a braking force between the first pair of pads of the first brake caliper 4 and the first brake disc 3, whereby guaranteeing a braking-parking action.

It is worth noting that, in order to apply a braking force on the first brake disc 3, the first piston 5 is adapted to act directly on the first pad of the first pair of pads of the first brake caliper 4, while a second pad of the first pair of pads of the first brake caliper 4 is adapted to move by reaction of the body of the first brake caliper 4 following the movement of the first pad of the first pair of pads of the first brake caliper 4.

The system 100 further comprises an electric motor 6 operatively connected to the first piston 5 by means of an electromechanical mechanism 7, diagrammatically shown in FIG. 1, adapted to convert a rotary motion of the electric motor 6 into a linear motion of the first piston 5.

The electromechanical mechanism 7 comprises a plurality of gears, e.g. gear of the screw-and-nut type, adapted to convert rotary motion into a linear motion.

The system 100 further comprises a data processing unit 8, e.g. a microprocessor or a microcontroller, operatively connected to an actuator (not shown in FIG. 1) of the electric motor 6.

The system 100 further comprises a memory unit 9, operatively connected to the data processing unit 8, configured for storing one or more program codes which can be run by the data processing unit 8 and to store the data processed by the data processing unit 8 when running said one or more program codes.

The system 100 further comprises one or more sensors 10 for detecting electric quantities of the electric motor 6, operatively connected to the data processing unit 8.

Electric quantities of the electric motor 6 mean the instantaneous electric current supplied to the electric motor 6 and the instantaneous electric voltage for electrically supplying the electric motor 6, both supplied by the system 100.

By way of example, said one or more sensors 10 (diagrammatically shown in FIG. 1) for detecting electric parameters of the electric motor 6 are at least an electric current sensor and an electric voltage sensor.

Figure 5:
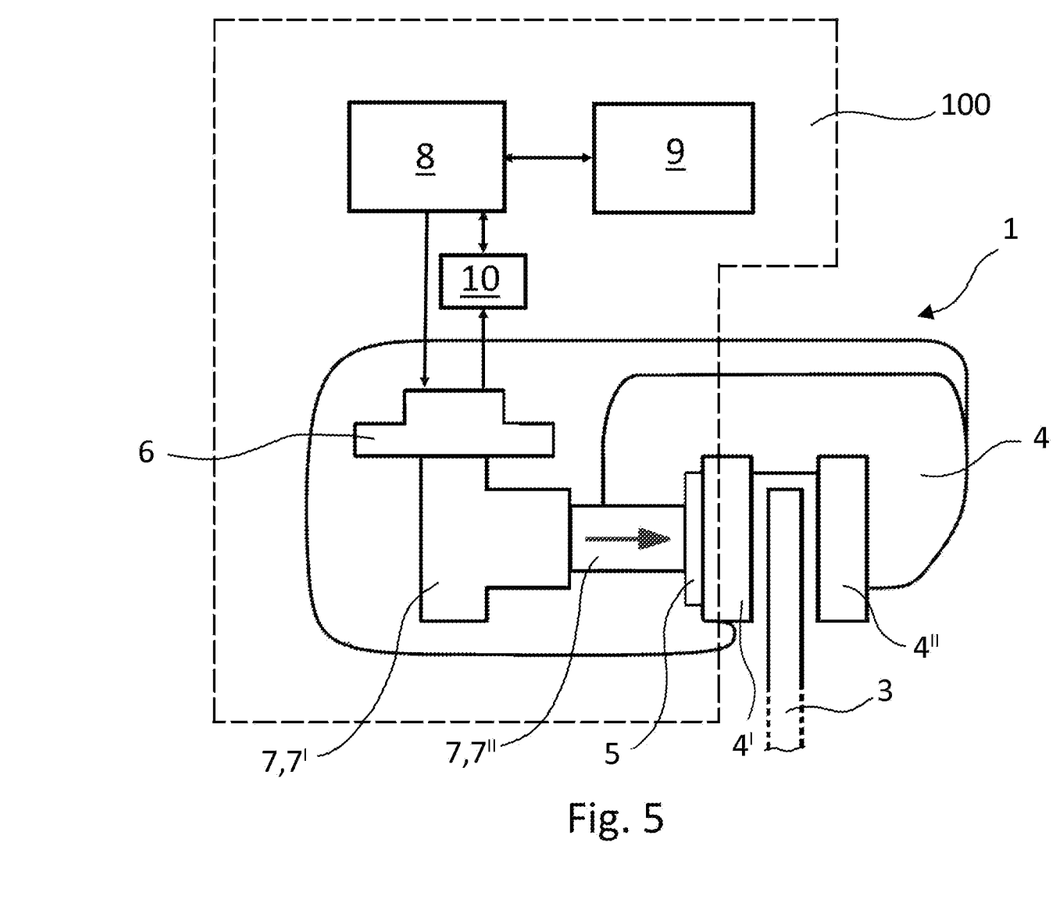
FIG. 5 diagrammatically shows a different representation of the electric parking-braking system of a vehicle of FIG. 1.

FIG. 5 shows another illustration of the system 100, associated with a vehicle 1.

The same references used in FIG. 1 are also used in FIG. 5.

In FIG. 5, the vehicle 1 comprises the first brake disc 3 mounted on the at least one first moving member (not shown in FIG. 5).

The vehicle 1 further comprises the first brake caliper 4 operatively associated with the first brake disc 3.

Furthermore, the first brake caliper 4 comprises a first pair of pads 4', 4" adapted to be actuated to apply a braking force to the first brake disc 3.

Again with reference to FIG. 5, the vehicle 1 comprises a first piston 5, operatively connected to a first pad 4' of the first pair of pads 4', 4" of the first brake caliper 4, which can be actuated to thrust the first pair of pads 4', 4" of the first brake caliper 4 so as to apply a braking force between the first pair of pads 4', 4" of the first brake caliper 4 and the first brake disc 3, whereby guaranteeing a braking-parking action.

It is worth noting that, in order to apply a braking force on the first brake disc 3, the first piston 5 is adapted to act directly on the first pad 4' of the first pair of pads 4', 4" of the first brake caliper 4, while a second pad 4" of the first pair of pads 4', 4" of the first brake caliper 4 is adapted to move by reaction of the body of the first brake caliper 4 following the movement of the first pad 4' of the first pair of pads 4', 4" of the first brake caliper 4.

The system 100 in FIG. 5 further comprises an electric motor 6 operatively connected to the first piston 5 by means of an electromechanical mechanism 7, diagrammatically shown in FIG. 5, adapted to convert a rotary motion of the electric motor 6 into a linear motion of the first piston 5.

The electromechanical mechanism 7 comprises, for example, a plurality of gears 7' and a ball screw 7" adapted to convert the rotary motion of the electric motor 6 into the linear motion of the first piston 5.

The system 100 in FIG. 5 further comprises the data processing unit 8 operatively connected to an actuator (not shown in FIG. 5) of the electric motor 6, the memory unit 9 and the one or more sensors 10 for detecting electric parameters of the electric motor 6, as described above.

With reference to both FIG. 1 and FIG. 5, in general, the data processing unit 8 is configured to run a method for estimating a braking force applicable between pad and brake disc by an electric parking-braking system of a vehicle.

Furthermore, the data processing unit 8 is configured to run a method of parking-braking of the electric type of the vehicle 1.

Figure 4:
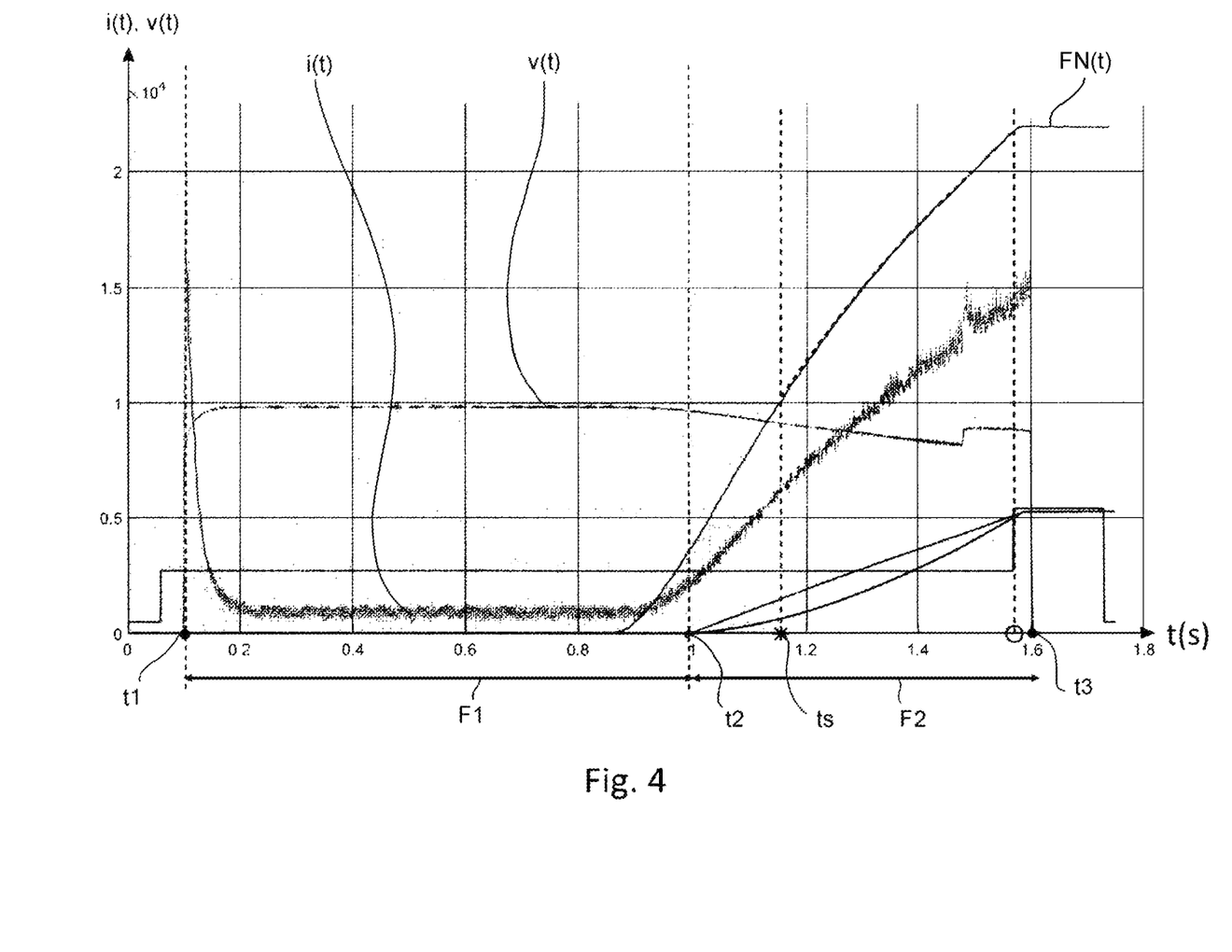
FIG. 4 shows, by means of a time diagram, the trend over time of electric parameters detectable in the electric parking-braking system of a vehicle of FIG. 1 during its operation.

It should be noted that, as also shown below, the method for estimating a braking force applicable between pad and brake disc by an electric parking-braking system of a vehicle is representative of a plurality of sub-steps of the more general electric parking-braking method of a vehicle (FIG. 4).

Both of the aforesaid methods will be described below with reference also to FIGS. 2, 3 and 4 in addition to FIG. 1.

Both methods will be described hereinafter with particular reference to FIGS. 2 and 3.

Turning back to the system 100 in FIG. 1 or FIG. 5, it is worth noting that the description referred, for the sake of brevity, to the action on the first pad of the first pair of pads of the first brake caliper 4 adapted to come into contact with the first brake disc 3 mounted on the at least one first moving member 2 of the vehicle 1.

According to other embodiments, not shown in the figure, the system 100 may further comprise one or more pistons, which can be operated by respective electric motors, by means of respective electromechanical mechanisms adapted to convert a rotary motion of the respective electric motor into a linear motion of the respective piston, each adapted to apply a thrust of a further pad of a further pair of pads of a further brake caliper adapted to go, in turn, into contact with a respective further brake disc mounted on a respective further wheel of the vehicle 1, which can therefore apply the parking brake force by means of the system 100.

Figure 2:
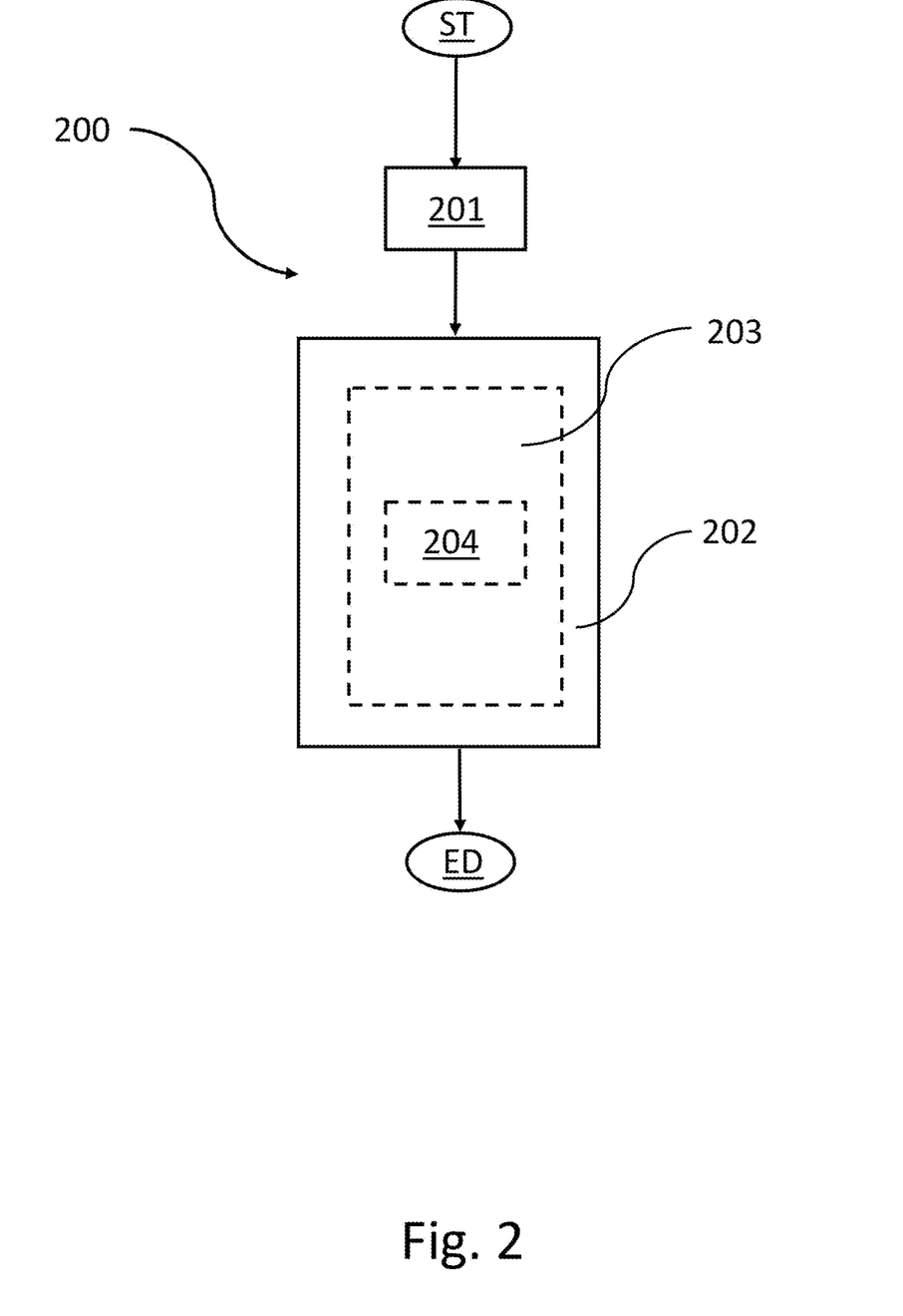
FIG. 2 shows, by means of a block diagram, a method for estimating a braking force applicable between pad and brake disc by an electric parking-braking system of a vehicle, according to an embodiment of the present invention.
Figure 3:
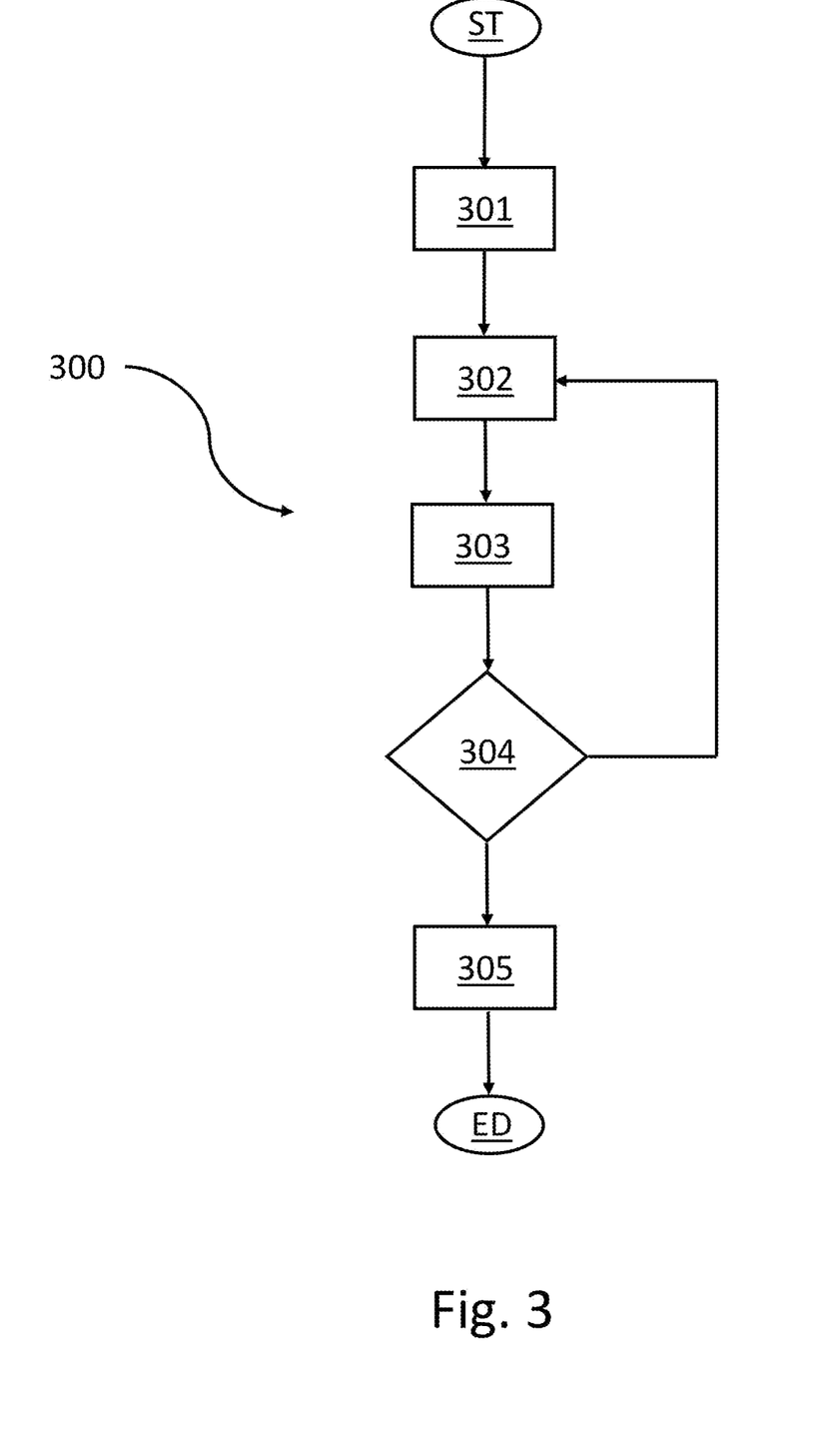
FIG. 3 shows, by means of a block diagram, a parking-braking method of electric type for a vehicle, according to an embodiment of the invention.

With reference now to FIGS. 2 and 4, a method 300 will be described for estimating a braking force applicable between pad and brake disc by a parking-braking system of a vehicle, such as the one described previously.

Firstly, in order to estimate an instantaneous braking force value applicable between pad and brake disc by the system 100, the Applicant has observed that is it possible to detect, in cost-effective manner, the instantaneous electric current i(t) supplied to the electric motor 6 and the instantaneous electric voltage v(t) for electrically supplying the electric motor 6 and on the basis of the detected electric current i(t) and electric voltage v(t), to estimate an instantaneous braking force value F(t) applied between pad and brake disc to be instantaneously compared with a reference braking force value FT.

Figure 6:
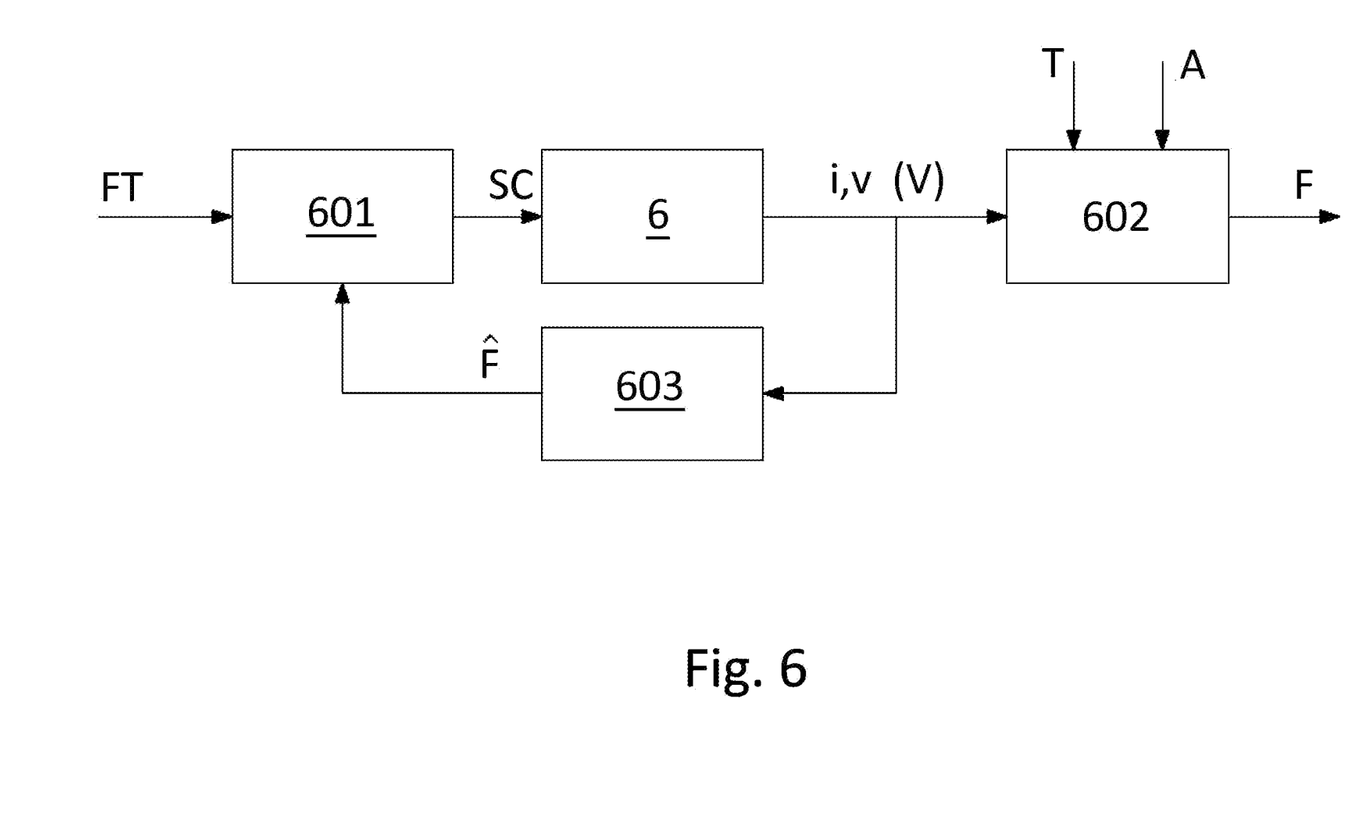
FIG. 6 shows an open-loop control diagram representative of a mode of operation of the system in FIG. 1, and FIGS. 7 and 8 show, by means of respective time diagrams, the trend over time of electric parameters detectable in the electric parking-braking system of a vehicle in FIG. 1 during its operation.

The open-loop control described here is illustrated from a logical point of view in the block diagram in FIG. 6 in which reference numeral 601 indicates a controller module adapted to generate a control signal SC for the electric motor 6 which will generate, in turn, by means of a electromechanical actuator module 602, an instantaneous braking force value F(t), indicated in the figure simply by reference F, to be applied between pad and brake disc to achieve the electric parking-braking action.

The control signal SC is generated by the controller module 601 on the basis of the instantaneous comparison between an estimate P of an instantaneous braking force value applied between pad and brake disc, generated by an estimator module 603 on the basis of the detected electric current i(t) and electric voltage v(t), and a reference braking force value FT.

It is worth noting that controller module 601 and the estimator module 603 may correspond to the data processing unit 8 of the system 100, described above, while the electromechanical actuator module 602 may correspond to the electromechanical mechanism 7 adapted to convert the rotary motion of the electric motor 6 into the linear motion of the piston 5 which is adapted to act on the first pair of pads of the first brake caliper 4.

It is worth noting that the open-loop control in FIG. 6 also takes into account the variation of the working conditions of the system 100, and thus also of nominal electric voltage V, temperature T and wear A.

With reference now also to FIG. 4, the Applicant has also identified the following stages into which a parking-braking operation can be divided from the temporal point of view: a first non-contact stage F1 between the first pair of pads of the first brake caliper 4 and the first brake disc 3 (hereinafter also simply non-contact stage) and a second contact stage F2 between the first pair of pads of the first brake caliper 4 and the first brake disc 3 (hereinafter also simply contact stage).

The first non-contact stage F1 goes from a first time instant t1 of the beginning of the parking-braking operation, in which the electric motor 6 is switched on (inrush stage), to a second time instant t2, in which the first pair of pads of the first brake caliper 4 goes into contact with the brake disc 6.

The second contact stage F2 goes from the second time instant t2, in which the first pair of pads of the first brake caliper 4 goes into contact with the brake disc 6, to a third time instant t3, corresponding to the end of the parking-braking operation.

It is worth noting that in the first non-contact stage F1, which can also be named idle or gap stage, the first piston 5 advances toward the first pad of the first pair of pads of the first brake caliper 4 before applying the necessary thrust to put the first pad of the first pair of pads of the first brake caliper 4 into contact with the first brake disc 3 and subsequently, by means of the reaction of the body of the first brake caliper 4, adapted to put the second pad of the first pair of pads of the first brake caliper 4 also into contact with the first brake disc 3 (beginning of the subsequent second contact stage F2).

Therefore, in the first non-contact stage F1, the electric motor 6 is adapted to turn idly to advance the first piston 5 towards the first pad of the first pair of pads of the first brake caliper 4 and, evidently in the absence of contact between the first pair of pads of the first brake caliper 4 and the brake disc 3, is adapted to not apply any braking force FN.

For this reason, with reference to FIG. 4, the trend of the electric current i(t) supplied to the electric motor 6, with the exception of a first instantaneous inrush value, which can be detected in the first time instant t1, caused by switching on the electric motor 6, has a low value due only to the rotation frictions of the electric motor 6 and the advancement of the first piston 5 for the duration of the first non-contact stage F1.

In the second contact stage F2, which can also be named force or clamping stage, the first piston 5 is in contact with the first pad of the first pair of pads of the first brake caliper 4 which, under the thrust of the first piston 5, is in contact with the first brake disc 3.

Consequently, by means of the reaction of the body of the first brake caliper 4, the second pad of the first pair of pads of the first brake caliper 4 is also in contact with the first brake disc 3.

So, in the second contact stage F2, the first pad of the first pair of pads of the first brake caliper 4, under the action of the first piston 5, is adapted to apply a braking force FN between the first pair of pads of the first brake caliper 4 and the first brake disc 3.

So, in the second contact stage F2, the electric motor 6 is adapted to turn in order to impart a braking force FN between the first pair of pads of the first brake caliper 4 and the first brake disc 3.

For this reason, again with reference to FIG. 4, the trend of the electric current i(t) supplied to the electric motor 6 has an increasing trend starting from the second time instant t2 for the duration of the second contact stage F2.

With reference again to FIG. 4, the trend over time of the electric voltage v(t) for electrically supplying the electric motor 6 increases, instead, when the electric motor 6 is switched on, substantially instantaneously to a predetermined operating value which remains substantially constant in the first non-contact stage F1 and then starts to decline in the second contact stage F2, due to the increase of the electric current i(t) supplied to the electric motor 6.

Figure 7:
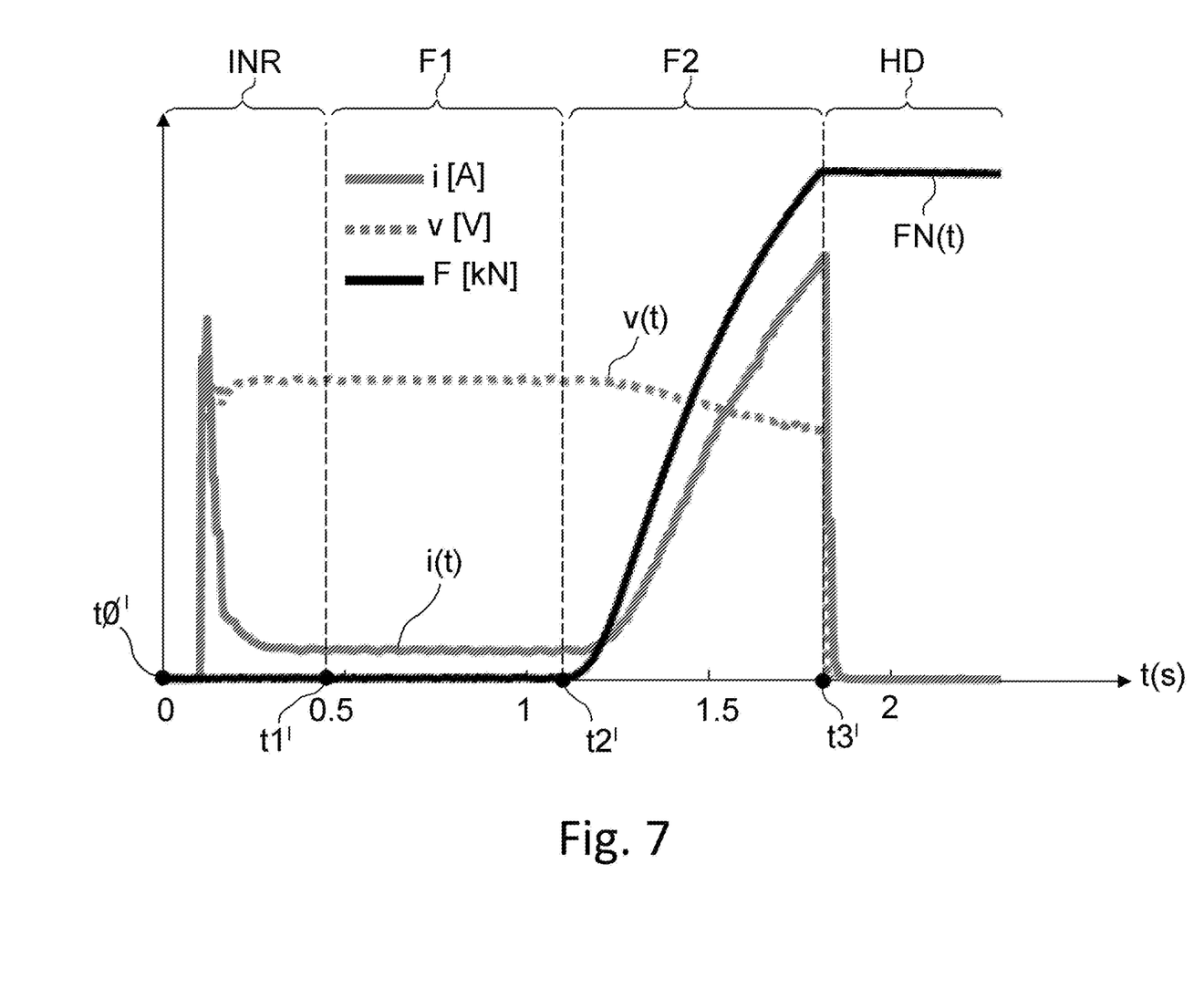

Another illustration of the signals above is shown in FIG. 7, in which the trend over time of the electric current i(t) supplied to the electric motor 6, the electric voltage v(t) for electrically supplying the electric motor 6 and the braking force FN imparted by the electric motor 6 between the first pair of pads of the first brake caliper 4 and the first brake disc 3 are shown.

It is worth noting that FIG. 7 shows the switch-on phase of the electric motor 6 (inrush stage, indicated by the reference INR, described above with reference to FIG. 4) between an initial time instant t0' and a first time instant t1', the first non-contact stage F1 (or gap stage, which has already been described above) between the first time instant t1' and a second time instant t2', the second contact stage F2 (force or clamping stage, described above with reference to FIG. 4) between the second time instant t2' and a third time instant t3' and a parking-braking hold stage HD starting from the third time instant t3'.

With particular reference to the second contact stage F2 and to FIG. 4, it is worth noting that the Applicant has defined, within the second contact stage F2, a set further time instant ts, comprised between the second time instant t2 and the third time instant t3, in which, according to the method 200 described below, the estimating of the braking force FN applicable between the first pair of pads of the first brake caliper 4 and the first brake disc 3 starts.

As will be described below with reference to the method 200, before the set further time instant ts, the data processing unit 8 is adapted to calculate data (variables and/or parameters), to be used in the subsequent estimation of braking force FN between the first pair of pads of the first brake caliper 4 and the first brake disc 3, on the basis of the instantaneous trend of the electric current i(t) and of the voltage v(t) between the second instant t2 and the set further time instant ts of the second contact stage F2.

Starting instead from the set further time instant ts, the data processing unit 8 is adapted to estimate the braking force FN between the first pair of pads of the first brake caliper 4 and the first brake disc 3, also on the basis of the previously calculated data to the set further time instant ts.

Therefore, it is worth noting that the choice of the set further time instant ts is important because it represents a compromise between how much accuracy to be obtained in the estimation of the braking force FN and how promptly to begin estimating the braking force FN between the first pair of pads of the first brake caliper 4 and the first brake disc 3.

Indeed, in the case in which the set further time instant ts is high (e.g. equal to hundreds of milliseconds), the data processing unit 8 has more information on the trend of the electric current i(t) and the electric voltage v(t) at its disposal on the basis of which to calculate data (variables and/or parameters) to be used in subsequent estimate, which will be more accurate. However, starting the estimation of the braking force FN later implies starting the estimation of the braking force FN at a consequently high initial value.

Conversely, in the case in which the set further time instant ts is lower than in the previous case (e.g. equal to a few tens of milliseconds), the data processing unit 8 can begin estimating the braking force FN earlier, starting to estimate the braking force FN from an initial low value. However, in doing so, the data processing unit 8 has less information at its disposal on the trend of the electric current i(t) and the electric voltage v(t) on the basis of which to calculate data (variables and/or parameters) to be used in subsequent estimate, which will be consequently less accurate.

With reference now to FIG. 2, the method 200 comprises a symbolic step of starting ST.

It is repeated that the vehicle 1 comprises: at least a first moving member 2; a first brake disc 3 mounted on said at least one first moving member 2; a first brake caliper 4 operatively associated with the first brake disc 3. The first brake caliper 4 comprises a first pair of pads adapted to be actuated to apply a braking force on the first brake disc 3.

Furthermore, the system 100 comprises: a first piston 5, operatively connected to a first pad of the first pair of pads of the first brake caliper 4, which can be actuated to thrust the first pair of pads of the first brake caliper 4 so as to apply a braking force between the first pair of pads of the first brake caliper 4 and the first brake disc 3; an electric motor 6 operatively connected to the first piston 5 by means of an electromechanical mechanism 7 adapted to transform a rotary motion of the electric motor 6 into a linear motion of the first piston 5; a data processing unit 8 operatively connected to an actuator of the electric motor 6; one or more sensors 10 for detecting electric quantities of the electric motor 6, operatively connected to the data processing unit 8.

The method 200 comprises a first step of detecting 201, by one or more sensors 10 of electric quantities of the electric motor 6 operatively connected to the data processing unit 8, an electric current i(t) supplied to the electric motor 6 and an instantaneous electric voltage value v(t) for electrically supplying the electric motor 6, during a parking-braking operation.

The parking-braking operation comprises a first non-contact stage F1 (idle or gap stage) between the first pair of pads of the first brake caliper 4 and the first brake disc 3 between a first time instant t1 representative of the beginning of the parking-braking operation and a second time instant t2 representative of the beginning of the contact between the first pair of pads of the first brake caliper 4 and the first disc 3.

The parking-braking operation further comprises a second contact stage F2 (force or clamping stage) between the first pair of pads of the first brake caliper 4 and the first brake disc 3 comprised between the second time instant t2 and a third time instant t3 representative of the end of the parking operation.

It is worth noting that a hold stage of the parking-braking is guaranteed from the third time instant t3, already defined above with reference to FIG. 7.

A set further time instant ts is defined during the second contact stage F2 between the second time instant t2 and the third time instant t3.

Turning back to the method 200, it further comprises a step of determining 202, by the data processing unit 8, starting from the set further time instant ts, an instantaneous braking force value at an estimate time instant on the basis of the electric current i(t) detected between the second time instant t2 and the estimate time instant and of the electric voltage v(t) detected between the second time instant t2 and the estimate time instant.

Indeed, being the scope of application that of electric parking-braking systems, i.e. equipped with electric motors, the Applicant has observed that the braking force applicable between pad and brake disc by the electric motor by means of the piston and the electromechanical mechanism for converting motion (from rotary to linear) can be derived from fundamental kinematic and electric motor equations if appropriately simplified and may be represented on the basis of the electric current i(t) and of the electric voltage v(t), as shown in the previous paragraph.

In particular, in an embodiment, not shown in the figures, in combination with the above, the instantaneous braking force FN value is determined at the estimate time instant, by the data processing unit 8, starting from the set further time instant ts, as a linear function of the electric current i(t) detected between the second time instant t2 and the estimate time instant and of the electric voltage v(t) detected between the second time instant t2 and the estimate time instant.

According to a further embodiment, not shown in the figures, alternatively to the above, the instantaneous braking force FN value is determined at the estimate time instant, by the data processing unit 8, starting from the set further time instant ts, as a function of the integral of the electric current i(t) detected between the second time instant t2 and the estimate time instant and of the integral of the electric voltage v(t) detected between the second time instant t2 and the estimate time instant.

Indeed, the Applicant has observed that the braking force applicable between pad and brake disc by the electric motor, by means of the piston and the electromechanical mechanism for converting motion (from rotary to linear), derivable from fundamental kinematic and electric motor equations if appropriately simplified may be indeed represented as a function of the integral of the electric current i(t) and of the integral of the electric voltage v(t), as mentioned in the previous paragraph.

In a further embodiment, not shown in the figures, in combination with the one above, the function of the integral of the electric current i(t) detected between the second time instant t2 and the estimated time instant and of the integral of the electric voltage v(t) detected between the second time instant t2 and the estimated time instant, by means of which the instantaneous braking force value at the estimated time instant may be determined, by the data processing unit 8, starting from the set further time instant (ts), is a linear type function.

Turning back to the embodiment in FIG. 2, the method 200 comprises a symbolic step of ending ED.

According to an embodiment, shown in the figures by dashed lines, in combination with the embodiment described above, the step of determining 202 comprises a step of calculating 203, by the data processing unit 8, a plurality of linear coefficients $\theta_0$–$\theta_m$ of such a linear function, each of which is calculated as a linear function of a plurality of parameters $T_1$–$T_n$ representative of the trend of the electric current i(t) and of the trend of the electric voltage v(t) of the electric motor 6 detected between the first time instant t1 and the set further time instant ts and of a matrix of coefficients α.

According to this embodiment, the relationship described above can also be represented with the following formula:

$$FN(t)=f(v(t),i(t),\theta_1-\theta_m)=f(v(t),i(t),\tau_1-\tau_n,\alpha)$$

In greater detail, the step of calculating 203 comprises a step of calculating 204, by the data processing unit 8, the plurality of parameters $T_1$–$T_n$ representative of the trend of the electric current i(t) and of the trend of the electric voltage v(t) of the electric motor 6 detected between the first time instant t1 and the set further time instant ts.

With regards to the step of calculating 204 of the plurality of parameters $T_1$–$T_n$, it is worth noting that, if n is equal to 6:

- a first parameter $T_1$ is calculated as peak value of the electric current i(t) at inrush in the first time instant t1, when the electric motor 6 is switched on;
- a second parameter $T_2$ is calculated as average value of the electric voltage v(t) for electrically supplying the electric motor 6 between the first time instant t1 and the second time instant t2;
- a third parameter $T_3$ is calculated as the electric current value i(t) supplied to the electric motor 6 in the first non-contact stage F1, after the first time instant t1 and the second time instant t2;
- a fourth parameter $T_4$ is calculated as processing (e.g. variance) of the electric current value i(t) supplied to the electric motor 6 in the first non-contact stage F1, after the first time instant t1 and the second time instant t2;
- a fifth parameter $T_5$ is calculated as gradient (derivative in time) of the electric voltage v(t) for electrically supplying the electric motor 6 between the second time instant t2 and the set further time instant ts;
- a sixth parameter $T_6$ is calculated as gradient (derivative in time) of electric current v(t) supplied to the electric motor 6 between the second time instant t2 and the set further time instant ts.

This list is shown by way of non-limiting example.

Indeed, it must be noted that the step of calculating 204 can be performed by calculating either all or only a part of such a plurality of parameters in as a function of the level of accuracy and of reliability of the estimation to be obtained.

Furthermore, the number of parameters of the plurality of parameters in can be reduced according to the type of system 100 and on the basis of the available calculation resources.

In other cases, the plurality of parameters in may comprise other additional parameters to the list above, e.g. the value of the integral of the electric current i(t) between the first time instant t1 and the second time instant t2, or the integral of the electric current i(t) between the first time instant t1 and subsequent 10-20 ms (integral of the inrush electric current peak).

It is worth noting that the plurality of parameters $T_1$–$T_n$ identify a working point of the system 100 as a whole, i.e. the assembly of the electric motor 6 of the electromechanical mechanism 7 (screw-nut screw gear, first piston 5 and so on).

Indeed, "working point" means the set of characteristics peculiar to the system 100 (system efficiency 100, the characteristics of the electric motor 6, the working temperature of the electric motor 6, the working life of the electric motor 6) when the system 100 already has a working life.

With regards to the coefficient matrix α, such coefficients α are calculated beforehand off-line by mutually comparing the results of an operating test of a parking-braking method in which the instantaneous braking force values FN between pad and brake disc are provided by a force sensor and the results of a parking-braking method in which the instantaneous braking force values FN between pad and brake disc are provided by a method of estimating a braking force applicable between pad and brake disc by a parking-braking system, as the one described with reference to FIG. 2, whereby minimizing the error committed by the estimate of the braking force with respect to the actual measurement of the braking force.

Once calculated off-line, the coefficients α are stored in the memory unit 9 of the system 100.

According to an embodiment (not shown in the figures), in combination with any one of those described above, the step of determining 202 comprises the step of applying the following formula as a linear function:

$$FN(t) = \theta_0 + \theta_1 \int_{t_2}' i(t) + \theta_2 \int_{t_2}' v(t)$$

Figure 8:
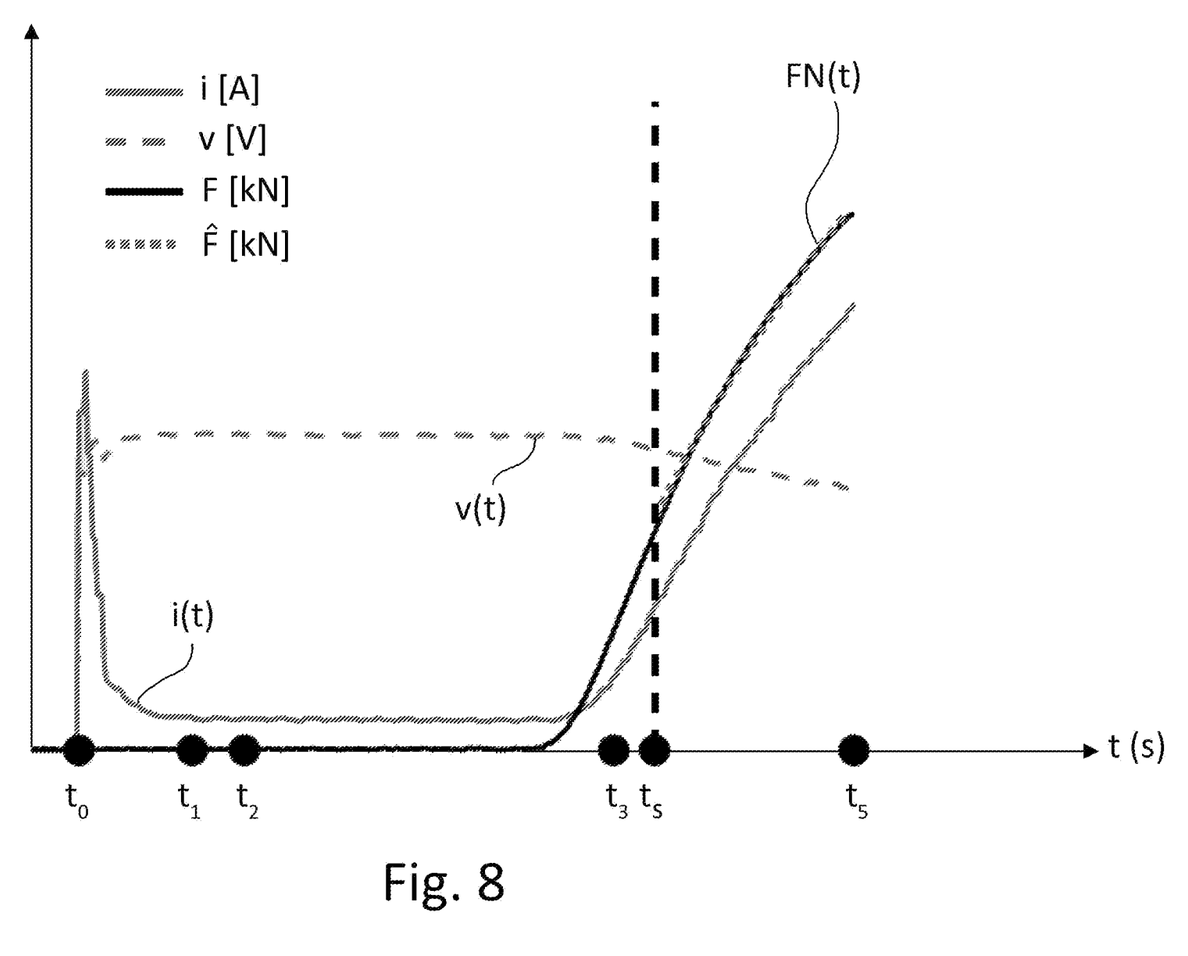

FIG. 8 describes another list by way of non-limiting example of a plurality of parameters $T_1$–$T_2$ in which can be determined with the step of calculating 204.

According to this example, it is worth noting that if n is equal to 7:
- a first parameter $T_1$ is calculated as the inrush peak value of the electric current i(t) in the first time instant t0, when the electric motor 6 is switched on, i.e. during the inrush stage;
- a second parameter $T_2$ is calculated as the value of the integral of the electric current i(t) between the first time instant t0 and a second time instant t1, i.e. during the inrush stage;
- a third parameter $T_3$ is calculated as the average electric current value i(t) supplied to the electric motor 6 in the first non-contact stage F1 between the second time instant t1 and a third time instant t2;
- a fourth parameter $T_4$ is calculated as the average electric voltage value v(t) for electrically supplying the electric motor 6 in the first non-contact stage F1 between the second time instant t1 and the third time instant t2;
- a fifth parameter $T_5$ is calculated as a variance value of the electric current i(t) supplied to the electric motor 6 in the first non-contact stage F1, between the second time instant t1 and the third time instant t2;
- a sixth parameter $T_6$ is calculated as gradient (derivative in time) of the electric current i(t) supplied to the electric motor 6 between a fourth time instant t3 and a set further time instant ts, during the second contact stage F2;
- a seventh parameter $T_7$ is calculated as gradient (derivative in time) of the electric voltage v(t) for electrically supplying the electric motor 6 between the fourth time instant t3 and the set further time instant ts, during the second contact stage F2.

It is worth noting that in FIG. 8 reference t5 indicates a fifth time instant in which a command is sent to stop the parking-braking operation.

A parking-braking method 300 will now described with reference to FIG. 3 according to an embodiment of the present invention.

The method 300 is performed by the parking-braking system 100 of a vehicle 1, described above.

The method 300 comprises a symbolic step of starting ST.

The method 300 comprises a step of receiving 301, by the data processing unit 8 of the system 100, a parking-braking request.

The method 300 further comprises a step of actuating 302, by an actuator controlled by the data processing unit 8, an electric motor 6.

An electromechanical mechanism 7 of the system 100 converts the rotary motion of the electric motor 6 into a linear motion of a first piston 5 which is adapted to apply a thrust on a first pair of pads of a brake caliper 4 of the vehicle 1.

The first pair of pads of the first brake caliper 4 of the vehicle 1 applies in turn a braking force on a first brake disc 3 mounted on at least a first moving member 2 of the vehicle 1.

Indeed, the first piston 5 is adapted to apply a thrust on a first pad of the first pair of pads of the first brake caliper 4 of the vehicle 1 and, subsequently, by means of a reaction of the body of the first brake caliper 4, also adapted to put in contact a second pad of the first pair of pads of the first brake caliper 4 with the first brake disc 3.

The method 300 comprises a step of estimating 303, by the data processing unit 8, the instantaneous braking force FN applied between the first pair of pads of the brake caliper 4 and the first brake disc 3, the step of estimating 303 comprising the steps of the method 200 for estimating a braking force applicable between pad and brake disc by a parking-braking system of a vehicle 1, described above according to different embodiments.

The method 300 comprises a step of comparing 304, by the data processing unit 8, the estimated value of the instantaneous braking force FN with a reference braking force.

If the estimated value of the instantaneous braking force FN is lower than the reference braking force, the method 300 proceeds with the step of actuating 302.

If the estimated value of the instantaneous braking force FN is equal to the reference braking force value, the method 300 comprises a step of stopping 305, by the data processing unit 8, the electric motor 6.

Adequate safety of the system 100 is guaranteed in this manner.

Additionally, the irreversibility of the electric parking-braking system makes it possible to hold the parking of the vehicle 1 after switching off the electric motor 6.

The method 300 comprises a symbolic step of ending ED.

It is worth noting that the object of the present invention is fully achieved.

The method for estimating the braking force applicable between pad and brake disc is based on fundamental electric motor and kinematic equations of the respective electric parking-braking system of a vehicle.

Therefore, since there is a bond between the physics of the system, the accuracy of the estimating method is improved.

The estimating method can provide an instantaneous value of the braking force applied between pad and brake disc, whereby effectively simulating the behavior of a force sensor which instant-by-instant provides a measurement of the applied braking force.

Therefore, the method and a respective system which are the object of the present invention make it possible to obtain an estimate of the braking force applied between pad and brake disc, whereby reducing dimensions and at low cost.

Furthermore, the estimating method and a respective system implementing such method, which are the object of the present invention, make it possible to improve the estimation accuracy of the braking force applied between pad and brake disc with respect to the methods described with reference to the background art in which the estimation of the braking force between pad and brake disc is based on the instantaneous measurement of the electric current supplied to the electric motor instead of calculating the integral of the electric current supplied to the electric motor and the integral of the electric voltage for electrically supplying the electric motor.

Moreover, the estimating method is quite versatile in that it makes it possible to flexibly adapt to very different working conditions of the system.

Furthermore, being based on a physical model, the estimating method provides results of good accuracy.

Additionally, being such model not only physical but also linear, the estimating method is flexible and robust for different targets on the basis of the data set during the step of calibrating and in its development.

Finally, it is worth noting that the data processing unit is configured to perform a first lower level control logic to perform the estimating method and is configured to run instead a second higher level control logic to run a parking-braking method, which exploits the braking force FN instantly estimated by the estimating method.

This condition makes it possible to exploit the lower level control logic with the same calibration as the upper level control logics, which for their own reasons apply different force targets.

For example, in the case of a vehicle which, in a first condition, needs to apply a first braking force of at least 10 KN in order to obtain a suitable and safe parking and, in a second condition, instead needs to apply a second braking force of at least 15 KN, the fact that there are two different braking forces to be applied is known only to the upper level control logic while the lower control logic is unchanged.

In this manner, a greater flexibility is guaranteed in how much the same estimating method can also be used in applications with different target braking according to the conditions in which the vehicle may be found.

The estimating method according to the present invention allows a robust control of the braking applicable between pad and brake disc by an electric parking-braking system.

Indeed, the estimating method requires no knowledge of any physical parameter of the braking system or of the vehicle but relies on experimental data collected for different operating conditions. In particular, the physical estimation model is supplied only with instantaneous electric current i(t) and instantaneous electric voltage v(t) of the electric motor of the system.

It is worth noting that the estimating method according to the present invention makes it possible to know the "working point" of the system 100 (efficiency of the system 100, the characteristics of the electric motor 6, electric voltage and nominal working temperature of the electric motor 6, operating life of the electric motor 6) by exploiting scalar characteristics of electric variables of the system 100 and is robust, because it is independent from working wear of the system 100 itself over time.

A person skilled in art may make changes and adaptations to the method and respective system described above or can replace elements with others which are functionally equivalent to satisfy contingent needs without departing from the scope of protection of the appended claims. All the features described above as belonging to one possible embodiment may be implemented independently from the other described embodiments.

The invention claimed is:

1. A method for estimating a braking force applicable between pad and brake disc by an electric parking-braking system of a vehicle, the vehicle comprising:
   at least a first moving member;
   a first brake disc mounted to said at least a first moving member;
   a first brake caliper operatively associated with the first brake disc, the first brake caliper comprising a first pair of pads adapted to be actuated to apply a braking force to the first brake disc,
   the system comprising:
   a first piston, operatively connected to a first pad of the first pair of pads of the first brake caliper, which can be actuated to thrust the first pair of pads of the first brake caliper so as to apply a braking force between the first pair of pads of the first brake caliper and the first brake disc,
   an electric motor operatively connected to the first piston by means of an electromechanical mechanism adapted to transform a rotary motion of the electric motor into a linear motion of the first piston;
   a data processing unit operatively connected to an actuator of the electric motor,
   one or more sensors for detecting electric quantities of the electric motor, operatively connected to the data processing unit;
   the method comprising the steps of:
   detecting, by said one or more sensors of electric quantities of the electric motor, an electric current i(t) supplied to the electric motor and an instantaneous value of the electric voltage v(t) for electrically supplying the electric motor, during a parking-braking operation, the parking-braking operation comprising a first non-contact stage between the first pair of pads of the first brake caliper and the first brake disc, which is between a first time instant representative of the beginning of the parking-braking operation and a second time instant representative of the beginning of the contact between the first pad of the first pair of pads of the first brake caliper and the first brake disc, the parking-braking operation further comprising a second contact stage between the first pair of pads of the first brake caliper and the first brake disc, which is between the second time instant and a third time instant representative of the end of the parking-braking operation, a set further time instant being defined in the second contact stage between the second time instant and the third time instant;
   determining, by the data processing unit, starting from the set further time instant, an instantaneous braking force value at an estimate time instant on the basis of the electric current i(t) detected between the second time instant and the estimate time instant and of the electric voltage v(t) detected between the second time instant and the estimate time instant,
   the instantaneous braking force value being determined at the estimate time instant, by the data processing unit, starting from the set further time instant, as a function of the integral of the electric current i(t) detected between the second time instant and the estimate time instant and of the integral of the electric voltage v(t) detected between the second time instant and the estimate time instant.

2. A method according to claim 1, wherein the function of the integral of the electric current i(t) detected between the second time instant and the estimate time instant and of the integral of the electric voltage v(t) detected between the second time instant and the estimate time instant, by means of which the instantaneous braking force value at the estimate time instant can be determined, by the data processing unit, starting from the set further time instant, is a linear type function.

3. A method according to claim 2, wherein the step of determining comprises a step of calculating, by the data processing unit, a plurality of linear coefficients of said linear function, each of which is calculated as a linear function of a plurality of parameters representative of the trend of the electric current i(t) and of the trend of the electric voltage v(t) of the electric motor detected between the first time instant and the set further time instant and of a matrix of coefficients.

4. A method according to claim 3, wherein the step of calculating comprises a step of calculating, by the data processing unit, the plurality of parameters representative of the trend of the electric current i(t) and of the trend of the electric voltage v(t) of the electric motor detected between the first time instant and the set further time instant.

5. A method according to claim 4, wherein the coefficients are calculated beforehand off-line by mutually comparing the results of an operating test of a parking-braking method in which the instantaneous braking force values between pad and brake disc are provided by a force sensor and the results of a parking-braking method in which the instantaneous braking force values between pad and brake disc are provided by a method of estimating a braking force applicable between pad and brake disc by a parking-braking system, minimizing the error committed by the estimate of the braking force with respect to the actual measurement of the braking force.

6. A parking-braking method, comprises the steps of:
receiving, by a data processing unit of an electrical parking-braking system of a vehicle, a parking-braking request;
actuating, by an actuator controllable by the data processing unit, an electric motor of the system, an electromechanical mechanism of the system transforming the rotary motion of an electric motor into a linear motion of a first piston adapted to apply a thrust to a first pair of pads of a first brake caliper of the vehicle, the first pair of pads of the first brake caliper of the vehicle applying, in turn, a braking force to the first brake disc mounted to at least a first moving member of the vehicle;
estimating, by the data processing unit, the instantaneous braking force applied between the first pair of pads of the brake caliper and the first brake disc, the step of estimating comprising
detecting, by said one or more sensors of electric quantities of the electric motor operatively connected to the data processing unit, an electric current i(t) supplied to the electric motor and an instantaneous value of the electric voltage v(t) for electrically supplying the electric motor, during a parking-braking operation, the parking-braking operation comprising a first non-contact stage between the first pair of pads of the first brake caliper and the first brake disc, which is between a first time instant representative of the beginning of the parking-braking operation and a second time instant representative of the beginning of the contact between the first pad of the first pair of pads of the first brake caliper and the first brake disc, the parking-braking operation further comprising a second contact stage between the first pair of pads of the first brake caliper and the first brake disc, which is between the second time instant and a third time instant representative of the end of the parking-braking operation, a set further time instant being defined in the second contact stage between the second time instant and the third time instant;
determining, by the data processing unit, starting from the set further time instant, an instantaneous braking force value at an estimate time instant on the basis of the electric current i(t) detected between the second time instant and the estimate time instant and of the electric voltage v(t) detected between the second time instant and the estimate time instant, the instantaneous braking force value being determined at the estimate time instant, by the data processing unit, starting from the set further time instant, as a function of the integral of the electric current i(t) detected between the second time instant and the estimate time instant and of the integral of the electric voltage v(t) detected between the second time instant and the estimate time instant;
comparing, by the data processing unit, the estimated value of the instantaneous braking force with a reference braking force;
if the estimated value of the instantaneous braking force is lower than the reference braking force, the method proceeds with the step of actuating;
if the estimated value of the instantaneous braking force is equal to the reference braking force value, the method comprises a step of stopping, by the data processing unit, the electric motor.

7. An electric parking-braking system of a vehicle, the vehicle comprising:
at least a first moving member;
a first brake disc mounted to said at least a first moving member;
a first brake caliper operatively associated with the first brake disc, the first brake caliper comprising a first pair of pads adapted to be actuated to apply a braking force to the first brake disc,
the system comprising:
a first piston, operatively connected to a first pad of the first pair of pads of the first brake caliper, which can be actuated to thrust the first pair of pads of the first brake caliper so as to apply a braking force between the first pair of pads of the first brake caliper and the first brake disc;
an electric motor operatively connected to the first piston by means of an electromechanical mechanism adapted to transform a rotary motion of the electric motor into a linear motion of the first piston;
a data processing unit operatively connected to an actuator of the electric motor,
one or more sensors for detecting electric quantities of the electric motor, operatively connected to the data processing unit, said one or more sensors of electric quantities of the electric motor, being configured to detect an electric current i(t) supplied to the electric motor and an instantaneous value of the electric voltage v(t) for electrically supplying the electric motor, during a parking-braking operation, the parking-braking operation comprising a first non-contact stage between the first pair of pads of the first brake caliper and the first brake disc, which is between a first time instant representative of the beginning of the parking-braking operation and a second time instant representative of the beginning of the contact between the first pad of the first pair of pads of the first brake caliper and the first brake disc, the parking-braking operation further comprising a second contact stage between the first pair of pads of the first brake caliper and the first brake disc, which is between the second time instant and a third time instant representative of the end of the parking-braking operation, a set further time instant being defined in the second contact stage between the second time instant and the third time instant;
the data processing unit being configured to determine, starting from the set further time instant, an instantaneous braking force value at an estimate time instant on the basis of the electric current i(t) detected between the second time instant and the estimate time instant and of the electric voltage v(t) detected between the second time instant and the estimate time instant, the instantaneous braking force value being determined at the estimate time instant, by the data processing unit, starting from the set further time instant, as a function of the integral of the electric current i(t) detected between the second time instant and the estimate time instant and of the integral of the electric voltage v(t) detected between the second time instant and the estimate time instant.

8. An electric system according to claim 7, wherein:

the data processing unit is configured to receive a parking-braking request, the actuator controllable by the data processing unit is configured to actuate the electric motor of the system, the electromechanical mechanism of the system transforming the rotary motion of the electric motor into a linear motion of the first piston adapted to apply the thrust to the first pair of pads of the first brake caliper of the vehicle, the first pair of pads of the first brake caliper of the vehicle applying, in turn, a braking force to the first brake disc mounted to at least a first moving member of the vehicle;

the data processing unit is configured to estimate the instantaneous braking force applied between the first pair of pads of the brake caliper and the first brake disc, in the step of estimating:

said one or more sensors of electric quantities of the electric motor operatively connected to the data processing unit being configured to detect the electric current i(t) supplied to the electric motor and the instantaneous value of the electric voltage v(t) for electrically supplying the electric motor, during the parking-braking operation, the parking-braking operation comprising the first non-contact stage between the first pair of pads of the first brake caliper and the first brake disc, which is between the first time instant representative of the beginning of the parking-braking operation and the second time instant representative of the beginning of the contact between the first pad of the first pair of pads of the first brake caliper and the first brake disc, the parking-braking operation further comprising the second contact stage between the first pair of pads of the first brake caliper and the first brake disc, which is between the second time instant and the third time instant representative of the end of the parking-braking operation, the set further time instant being defined in the second contact stage between the second time instant and the third time instant;

the data processing unit being configured to determine, starting from the set further time instant, the instantaneous braking force value at the estimate time instant on the basis of the electric current i(t) detected between the second time instant and the estimate time instant and of the electric voltage v(t) detected between the second time instant and the estimate time instant, the instantaneous braking force value being determined at the estimate time instant, by the data processing unit, starting from the set further time instant, as a function of the integral of the electric current i(t) detected between the second time instant and the estimate time instant and of the integral of the electric voltage v(t) detected between the second time instant and the estimate time instant;

the data processing unit being further configured to:

compare the estimated value of the instantaneous braking force with a reference braking force;

if the estimated value of the instantaneous braking force is lower than the reference braking force, proceed with the step of actuating;

if the estimated value of the instantaneous braking force is equal to the reference braking force value, stop the electric motor.

* * * * *